US008965430B2

(12) United States Patent
Landström et al.

(10) Patent No.: US 8,965,430 B2
(45) Date of Patent: Feb. 24, 2015

(54) METHOD AND APPARATUS FOR CONTROLLING CHANNEL QUALITY REPORTING MODES USED BY WIRELESS COMMUNICATION NETWORK USERS

(75) Inventors: Sara Landström, Luleå (SE); Magnus Thurfjell, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 584 days.

(21) Appl. No.: 13/173,997

(22) Filed: Jun. 30, 2011

(65) Prior Publication Data

US 2013/0005382 A1 Jan. 3, 2013

(51) Int. Cl.
H04B 7/00 (2006.01)
H04B 7/06 (2006.01)
H04L 1/00 (2006.01)
H04W 24/10 (2009.01)
H04B 7/04 (2006.01)

(52) U.S. Cl.
CPC .............. *H04B 7/0639* (2013.01); *H04B 7/065* (2013.01); *H04L 1/0019* (2013.01); *H04L 1/0026* (2013.01); *H04L 1/003* (2013.01); *H04W 24/10* (2013.01); *H04B 7/0469* (2013.01); *H04B 7/0632* (2013.01)
USPC ......... 455/509; 455/127.1; 455/522; 455/425

(58) Field of Classification Search
USPC ............. 455/517, 450, 450.1, 452.2, 453, 62, 455/67.11
See application file for complete search history.

(56) References Cited

U.S. PATENT DOCUMENTS

| 8,787,245 | B2 * | 7/2014 | Seo et al. ................. 370/315 |
| 2007/0060178 | A1 * | 3/2007 | Gorokhov et al. ........... 455/506 |
| 2008/0031368 | A1 * | 2/2008 | Lindoff et al. ............... 375/260 |
| 2008/0043711 | A1 * | 2/2008 | Hart et al. ................... 370/348 |
| 2008/0102796 | A1 * | 5/2008 | Morita ........................ 455/411 |
| 2009/0207803 | A1 * | 8/2009 | Kawamura et al. .......... 370/330 |
| 2010/0091893 | A1 | 4/2010 | Gorokhov |
| 2010/0304691 | A1 * | 12/2010 | Goransson et al. ............ 455/69 |
| 2012/0155561 | A1 * | 6/2012 | Seo et al. ..................... 375/260 |
| 2012/0320862 | A1 * | 12/2012 | Ko et al. ...................... 370/329 |
| 2013/0005382 | A1 * | 1/2013 | Landstrom et al. .......... 455/517 |

(Continued)

FOREIGN PATENT DOCUMENTS

EP 2187685 A1 5/2010
WO 2011053204 A1 5/2011

OTHER PUBLICATIONS

Simonsson, A. et al., "LTE Downlink 2X2 MIMO With Realistic CSI: Overview and Performance Evaluation," Wireless Communications and Networking Conference, Apr. 18, 2010, pp. 1-6, IEEE Communications Society.

(Continued)

*Primary Examiner* — Bobbak Safaipour
(74) *Attorney, Agent, or Firm* — Coats & Bennett, P.L.L.C.

(57) ABSTRACT

According to this disclosure, a base station or other controlling node within a wireless communication network determines which channel state information reporting mode should be used by individual users among a plurality of active users being supported by the network. In particular, the determination is made as to whether or not an individual user should use frequency-selective reporting and, if so, whether the user should report a frequency-selective channel quality indicator or a frequency-selective precoder matrix indicator.

25 Claims, 6 Drawing Sheets

(56) References Cited

U.S. PATENT DOCUMENTS

2013/0064174 A1\* 3/2013 Kim et al. ................ 370/315
2013/0237228 A1\* 9/2013 Womack et al. ............ 455/436

OTHER PUBLICATIONS

Motorola, "Remaining details of CSI feedback on PUCCH and PUSCH," 3GPP TSG RAN1#63, Nov. 15-19, 2010, R1-106277.

3rd Generation Partnership Project,Technical Specification Group Radio Access Network, "Evolved Universal Terrestrial Radio Access (E-UTRA); Physical layer procedures," Mar. 2011, (Release 10), 3GPP TS 36.213 V10.1.0.

3rd Generation Partnership Project. LTE; Evolved Universal Terrestrial Radio Access (E-UTRA); Physical layer procedures (3GPP TS 36.213 version 8.5.0 Release 8); Feb. 2009; pp. 1-75; TS 36.213 V 8.5.0; Sophia Antipolis Cedex, France.

3rd Generation Partnership Project. Technical Specifications Group Radio Access Network; Evolved Universal Terrestrial Radio Access (E-UTRA) Radio Resource Control (RRC); Protocol specification (Release 8); 3GPP TS 36.331 V8.4.0; Dec. 2008; pp. 1-198; Sophia Antipolis Valbonne, France.

\* cited by examiner

METHOD AND APPARATUS FOR CONTROLLING CHANNEL QUALITY REPORTING MODES USED BY WIRELESS COMMUNICATION NETWORK USERS

FIELD OF THE INVENTION

The present invention generally relates to wireless communication networks, and particularly relates to choosing channel quality reporting modes to be used by individual users competing for resources within a defined system bandwidth.

BACKGROUND

Wireless communication networks typically make a number of ongoing service decisions based on the channel qualities associated with the individual users being served. For example, users experiencing better channel conditions may be served in preference to users experiencing poor channel conditions mil/or may be served at higher data rates. In general, newer wireless communication networks may schedule uplink and/or downlink transmission resources in dependence on the channel qualities reported by the current crop of active users.

As wireless communication networks evolve, the range and sophistication of transmit link adaptations made responsive to channel quality increases. For example, in wireless communication networks that use Multiple-Input-Multiple-Output (MIMO) transmission techniques, the decision to use MIMO and the particular MIMO configuration adopted for transmissions to or from a given user may be based at least in part on the channel conditions experienced by that user.

In Long Term Evolution (LTE) wireless communication, there are two channels normally used for sending channel quality information (also referred to as channel quality feedback). One such channel is the Physical Uplink Control Channel (PUCCH) and the other such channel is the Physical Uplink Shared Channel (PUSCH). The PUCCH generally is used for sending periodic channel quality reports, while the PUSCH may be used for sending channel quality information in conjunction with uplink data transmissions.

One or both such channels support different modes of channel quality reporting, also referred to as Channel State Information (CSI) reporting. As a general proposition, a individual user may report a wideband Channel Quality Indicator (CQI) that indicates to the serving LTE base station (an eNodeB) the overall channel quality across the system bandwidth. Here, the user may be essentially any type of access equipment, such as cellular phone, wireless modem, etc. Further, the "system" bandwidth may, in one or more examples, be understood as the aggregate bandwidth of the overall Orthogonal Frequency Division Multiplexing (OFDM) carrier that is used for serving users in the downlink.

In one or more related modes, the user reports a wideband CQI but additionally reports frequency-selective Precoder Matrix Indicators (PMIs). For example, the system bandwidth may be subdivided into multiple subbands, with a PMI value reported for each subband. These PMIs will be understood as the user's recommendations for precoding multi-antenna transmissions to the user within each such subband. The serving base station may or may not follow those recommendations but they nonetheless represent the individual user's frequency-selective recommendations based on, for example, the user evaluating channel conditions within each defined subband of the overall system bandwidth.

Conversely, rather than reporting a wideband CQI with or without frequency-selective PMIs, an individual user may report frequency-selective CQIs, with each reported CQI representing the channel quality estimate for a given one of the defined frequency subbands. The frequency-selective CQIs may be reported with a wideband PMI, representing a precoder selection recommendation that is generally applicable to the whole system bandwidth.

Thus, the various channel quality reporting modes may be understood as striking different balances between the granularity of PMI reporting versus CQI reporting. Two CSI modes have been shown to perform well for MIMO in previous LTE network studies, e.g. PUSCH 1-2 and PUSCH 3-1. PUSCH 3-1 includes frequency selective CQIs, thus enabling frequency selective scheduling. The "−1" denotes that the report includes only one PMI for the whole bandwidth. PUSCH 1-2 has only a single wideband CQI, and instead reports multiple PMIs. For example details CSI reporting modes in LTE, refer to ETSI TS 136 213 V10.1.0 (2011-04), *LTE; Evolved Universal Terrestrial Radio Access (E-UTRA); Physical layer procedures* (referred to as 3GPP TS 36.213 version 10.1.0 Release 10).

CQI mode control may be carried out using Radio Resource Control (RRC) protocol signaling. RRC signaling is performed over the data channel and, as it is control information represents overhead, it should be kept to a minimum. On the other hand, the system should be able to quickly reconfigure the CSI reporting mode, e.g., on the order of tens of milliseconds. For example details regarding CSI mode configuration, again refer to TS 36.213, with particular reference to Section 7.2.

SUMMARY

According to this disclosure, a base station or other controlling node within a wireless communication network determines which channel state information reporting mode should be used by individual users among a plurality of active users being supported by the network. In particular, the determination is made as to whether or not an individual user should use frequency-selective reporting and, if so, whether the user should report a frequency-selective channel quality indicator or a frequency-selective precoder matrix indicator.

For example, the controlling node in one or more embodiments considers the frequency scheduling freedom available for serving the user, and considers the frequency selectively of the propagation channel associated with serving the user. A higher degree of freedom in scheduling which frequencies or frequency subbands that are used for serving the user favors the use of frequency-selective channel quality reporting by the user, because that allows a scheduler to "see" which frequencies or subbands are best suited for serving the user. Conversely, a higher degree of frequency selectivity in the propagation channel favors the user of frequency-selective precoder reporting, because that allows a multi-antenna transmission controller to better adapt multi-antenna transmit preceding to the user, in consideration of the channel's frequency selectivity.

The reporting mode decision processing may run in real time within the controlling network node, so that the configured reporting modes of the individual users are updated responsive to ongoing changes in channel conditions, etc. For example, in at least one embodiment, a network base station, such as an eNodeB in an Long Term Evolution (LTE) network, is configured to dynamically determine the reporting modes to be used by individual ones of the users, based on determining the scheduling freedom available for allocating frequency resources to the users, and further based on evaluating the coherence bandwidth of the propagation channels to or from the users.

In one embodiment disclosed by way of illustrative example, a method in a wireless communication network node chooses a reporting mode to be used by an individual user among a plurality of active users competing for resources within a defined system bandwidth used for serving said plurality of active users. Here, the resources are, for example, resource blocks within the time-frequency grid of an OFDM carrier having an aggregate system bandwidth spanned by a plurality of regularly spaced narrowband subcarriers.

For any given individual one of the users, the method includes estimating a coherence bandwidth of a transmission channel to or from the user, where the coherence bandwidth represents a frequency selectivity of the transmission channel. The method further includes predicting a transmission bandwidth for the user, based at leas part on a total number of the active users, evaluating the transmission bandwidth with respect to said coherence bandwidth and the system bandwidth, and determining whether to configure the user to use frequency-selective channel quality reporting or frequency-selective precoder reporting, or neither, in dependence on said evaluation.

In this regard, the method will be understood as making a considered, individualized decision on the reporting node in view of multiple factors that influence which reporting mode best fits current loading and channel conditions. Frequency-selective channel quality reporting comprises, for example, the user sending a report that includes two or more Channel Quality Indicators (CQIs), each one corresponding to a different frequency range or subband within the overall system bandwidth. Similarly, frequency-selective precoder reporting comprises, for example, the user sending a report that includes two or more Precoder Matrix indexes (PMIs), each one pointing to or otherwise indicating a precoder matrix recommended for use in precoding multi-antenna transmissions to the user within a particular frequency range or subband of the overall system bandwidth. In the case that neither frequency-selective channel quality reporting or frequency-selective precoder reporting is selected, the selected mode may be understood as a wideband reporting mode where only wideband values e.g., one value covering the whole system bandwidth—is reported by the user. In the wideband reporting mode, the user may report a wideband CQI with or without a wideband PMI, or vice versa.

In another example embodiment, a wireless communication network node is configured to dynamically choose a reporting mode to be used by an individual user among a plurality of active users competing for resources within a defined system bandwidth used for serving said plurality of active users. The node comprises a number of processing units or functional circuits, which may be implemented at least partly in digital processing resources—such as microprocessor-based circuits—according to the execution of stored computer program instructions.

Of course, at least a portion of the contemplated processing units may be implemented in fixed circuitry, such as dedicated signal processing circuits. In this regard, it will be understood that the node is, for example, a base station configured for use in a wireless communication network. Such base stations commonly include significant computer and signal processing resources, used for call handling and control, along with backhaul, sidehaul, and radio transceiver-based communication interfaces, for communicating with core network entities, other base stations, and various types of access terminals operating within the coverage area of the base station.

In a particular but non-limiting example embodiment, the node includes a coherence bandwidth estimation circuit configured to estimate coherence bandwidth of a transmission channel to or from an individual user. As before, the coherence bandwidth represents a frequency selectivity of the transmission channel. The node further includes a transmission bandwidth prediction circuit configured to predict a transmission bandwidth for the user, based at least in part on a total number of said active users. Still further, the node includes an evaluation circuit configured to evaluate said transmission bandwidth with respect to the coherence bandwidth and the system bandwidth. Additionally, the node includes a decision circuit configured to determine whether to configure the user to use frequency-selective channel quality reporting or frequency-selective precoder reporting in dependence on the evaluation by said evaluation circuit.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
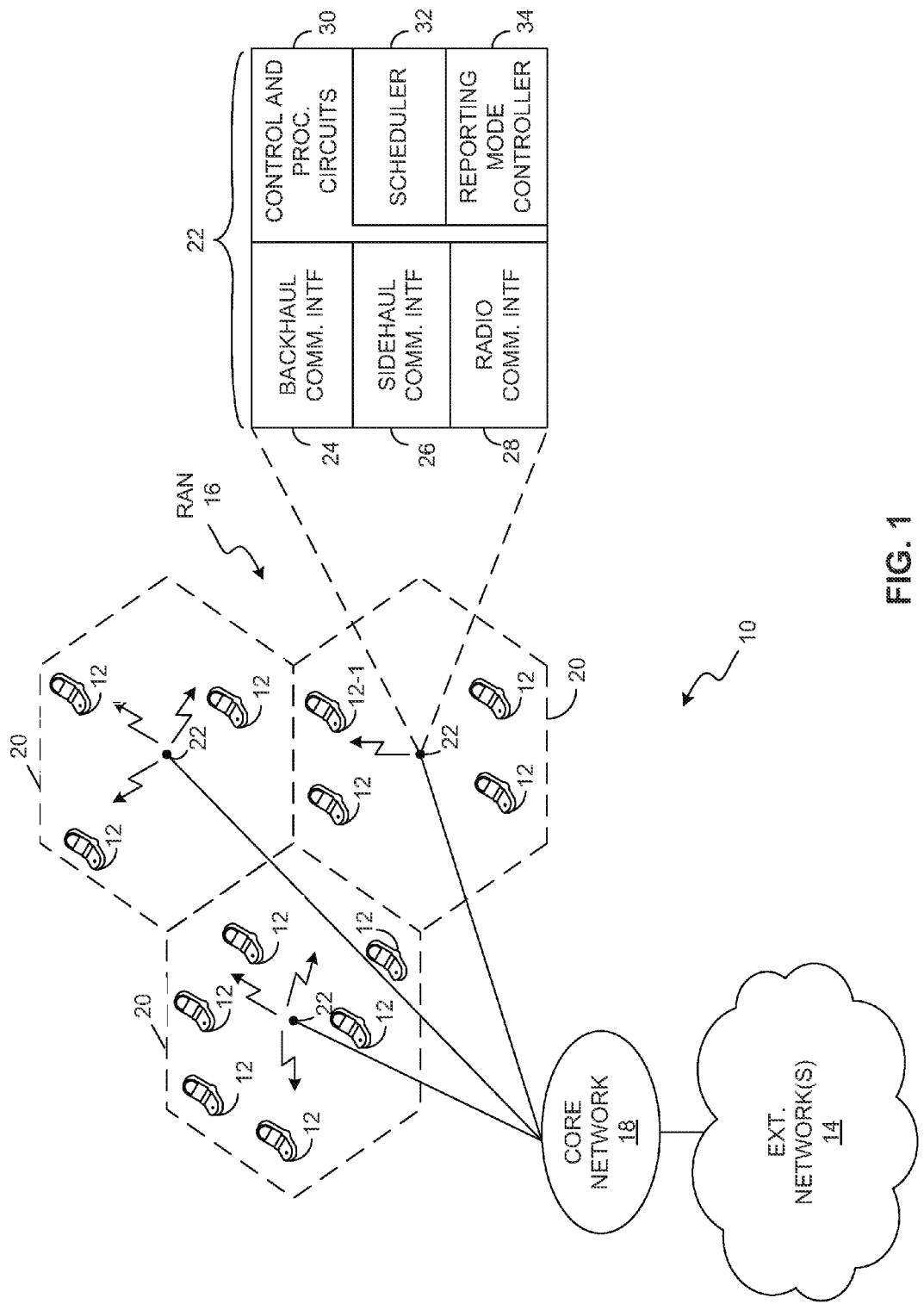
FIG. 1 is a block diagram of a wireless communication network according to an embodiment of the user channel quality reporting mode determination taught herein.

FIG. 1 illustrates an example wireless communication network 10. The illustrated network 10 communicatively couples users 12 to each other within the network 10 and/or to other entities in one or more external networks 14. A Radio Access Network (RAN) 16 of the network 10 provides he air interface for communicating with the users 12 via radio signaling, while the Core Network (CN) 18 provides access and accounting controls, as well as providing the communication links and routing functions necessary for linking the users 12 to the external network(s) 14.

As note(earlier herein, the term "users" serves as a convenient shorthand for user equipment (UE), which itself is a term that should be given broad construction and includes, without limitation, cellular radiotelephones, including smartphones, etc., wireless adaptors or network modems, and other types of wireless communication devices that are adapted for use within the network 10. Such adaptations include appropriately configured radio transceivers, such as each user 12 including an LTE-based transceiver for communicating with an LIE embodiment of the network 10.

The RAN 16 includes cells or sectors 20, which may be understood as defined radio service areas each managed by a corresponding base station 22. In an LIE embodiment of the network 10, the base stations 22 are eNodeBs that have been configured according to an embodiment of the reporting mode determination method presented herein. Further, in an example implementation of the base stations 22, FIG. 1 illustrates each base station 22 as including a backhaul communication interface 24 configured for communicating with the CN 18, a sidehaul communication interface 26 configured for communicating with other base stations 22, a radio communication interface 28 configured for communicating with the users 12 via radio signaling, and control and processing circuits 30 configured for overall call control and processing, including connecting users to the network 10.

In particular, the illustrated control and processing circuits 30 include a scheduler 32 and a reporting mode controller 34. While the reporting mode controller 34 is of particular interest, its operations and the attendant advantages of those operations are best understood in the context of scheduling, which for example may be time-selective and/or frequency-selective. As an example of time-selective scheduling, different users 12 use the same frequency resources at different times. As an example of frequency-selective scheduling, different users 12 use different frequency resources at the same time.

Here, "time" may connote a scheduling interval which is repeated on an ongoing basis, where the scheduler 32 decides which users 12 are allocated resources within each scheduling interval (such may be done on the downlink and/or on the uplink), and further decides which particular resources are assigned to which particular users 12 within each scheduling interval. For the downlink example involving OFDM-based carriers, the scheduler 32 decides how the data andcontrol signaling for given users 12 are mapped onto the time-frequency resources of the OFDM carrier. The scheduler 32 may include or be associated with a transmission controller that carries out scheduled transmissions.

Continuing with the OFDM example, the scheduler 32 assigns resource blocks (RB) to a user and controls such allocations in time and frequency. In an example definition, one RB spans six or seven consecutive OFDM symbols in the time domain and 12 consecutive subcarriers (180 KHz) within the plurality of subcarriers comprising the overall OFDM carrier signal. In one approach, the scheduler 32 schedules the user(s) 12 with the momentarily better channel (s), to thereby achieve so-called scheduling gains that maximize throughput over time. Additionally, the scheduler 32 can accommodate channel variations in the frequency domain by attempting to schedule users 12 on the frequencies where those users 12 enjoy better channel conditions.

Figure 2:
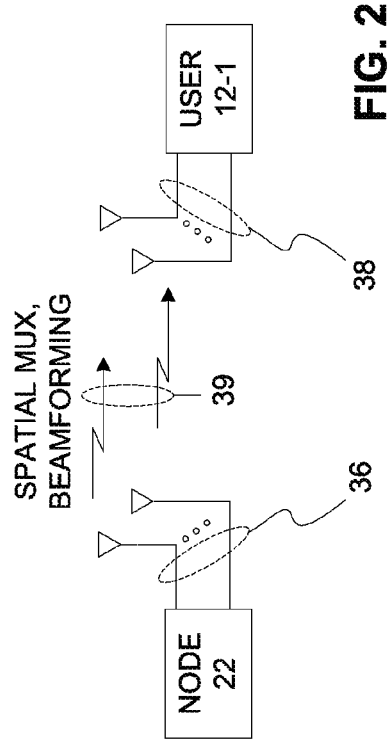
FIG. 2 is a block diagram of multi-antenna transmission details as may be carried out between a node and a user in the wireless communication network of FIG. 1.

Referring momentarily to FIG. 2, one sees that the node 22 has multiple antennas 36—i.e., two or more—for transmitting to and/or receiving from a given user 12, denoted as user 12-1 in the diagram. The user 12-1 also has multiple antennas 38 for transmitting to and/or receiving from the node 22. In at least one embodiment, the node 22 is configured for Multiple-Input-Multiple-Output (MIMO) transmission on the downlink, wherein it implements a multi-antenna transmission scheme, such as spatial multiplexing. In this regard, the node 22 uses transmit precoding, wherein it weights the signal(s) transmitted by respective ones of its multiple antennas 36 according to precoding values referred to as precoding weights.

The set of precoding weights may be understood as a transmit weight matrix W, which can be chosen from a fixed and countable set of precoder matrices $$W=\{W_1, W_2, \ldots, W_K\}, \tag{1}$$

where $W_1$, $W_2$, and so on, represent predefined transmit weight matrices which may be selected for use in transmit precoding. This approach is often referred to as codebook based precoding because one or more codebooks of defined transmit weight matrices W are stored and particular selections of W are achieved by indexing into the codebook. For purposes of this disclosure, W is referred to a "precoder" to denote its use in antenna transmit precoding.

In a known approach, the user 12-1 evaluates current channel conditions and makes a precoder recommendation to the node 22 by including a Precoder Matrix Indicator (PMI) in its channel quality report. The PMI value comprises or relates to an index value that be used to access the recommended precoder from a stored codebook. Of course, PMI signaling as a general proposition is known and this disclosure focuses on determining whether frequency-selective PMI signaling should be used, as compared to frequency-selective CQI signaling or non-selective, wideband reporting of PMI and/or CQI. Still further, it should be noted that precoders can be chosen without codebook restrictions.

However, codebook based precoding is one of the primary transmission modes in LTE and can be viewed as a sort of channel quantization that facilitates low rate feedback of channel information from the receiver—here, the user 12-1. In Frequency Division Duplexing (FDD), such channel feedback is a prerequisite for performing channel dependent precoding that tracks the fast fading because measurements from reception of transmissions in the reverse link generally cannot be used to guide precoder selection at the node 22 because of the large duplex distance between forward and reverse link carriers.

In the context of precoding, beamforming may be considered as a special case. That is, from a transmission structure point of view, there is no difference between precoding and beamforming. In fact, beamforming can be understood as a special case of the generic notion of (channel dependent) precoding. The term "beamforming" is taken to mean a component of a transmission scheme and antenna setup that intentionally strives to form at least one localized beam in the physical space.

There are various ways the modulated symbols being transmitted by the node 22 can be distributed onto the transmit antenna array represented by the set of antennas 36 depicted in FIG. 2 for the node 22. In beamforming, a single symbol $s_1$ is multiplied by a channel dependent weight vector w that introduces antenna specific phase adjustments, producing the transmitted vector $$x = ws_1 = \begin{bmatrix} w_1 \\ w_2 \\ \vdots \\ w_{N_T} \end{bmatrix}. \quad (2)$$

The phase adjustments are such that the signals from the different antennas 36 add constructively on the receiver side (i.e., at the user 12-1). This operation improves SNR and thus coverage. The SNR improvement increases with the number of transmit antennas 36 available for such operations. Roughly speaking, the so-called array-gain is proportional to the number of transmit antennas 36, meaning that doubling the number of transmit antennas 36 gives a 3 dB gain in SNR. A related observation is that the army gain obtained through beamforming generally yields improved SNR for users 12 at cell edges. Conversely, the benefits of beamforming are less pronounced for users 12 that are closer to the cell center and are otherwise experiencing good channel conditions.

A further point is that beamforming for any given one of the users 12 relies on the physical direction between node 22 and the user 12. This property of the propagation channel to the user 12 varies only on a relatively long-term basis unless the user is moving at a high speed. This fact simplifies the selection of suitable weight vectors for beamforming and also reduces signaling overhead. Note, too, that directional information in the channel is reciprocal regardless of TDD or FDD—that is, the directional properties are the same for the uplink and downlink channel—so beamforming may be based on weights determined from reverse link measurements, even in FDD.

Turning to spatial multiplexing, the SNR may be shared by simply encoding and modulating two blocks of information bits separately and transmitting the resulting two symbol streams with different precoding over the transmit antennas 36. This transmission technique is referred to as spatial multiplexing. In practice, the signal on each receive antenna, e.g., one each antenna 38 at the user 12-1 depicted in FIG. 2, will be a superposition of the signals stemming from all transmit antennas 36. Thus, the transmitted signals interfere with each other, leading to inter-stream interference.

Keeping the total transmitted power the same and further assuming the channels have the same SNR, that SNR value will be half of the SNR value for a single stream transmission using the same total power on only one antenna. On the other hand, there are now two data pipes to use, offsetting the reduction in the common SNR value.

In wireless communication networks such as LTE, not only noise but also interference from other cells 20 disturbs the transmissions. That is, transmissions to or from the users 12 operating in one cell 20 interfere with the transmissions to or from the users 12 operating in the surrounding cells 20. Such inter-cell interference is typically rather strong on the cell-edge and then considerably weaker closer to the cell center white the opposite is true for the received energy of the intended transmission.

Correspondingly, this means that the geometry (received power of the desired signal in relation to interference from all surrounding cells) is high close to the cell center and then gradually decreases as the cell edge is approached. Consequently, improving the SNR by means of beamforming is well suited for cell-edge users 12 which operate on the lower and linear part of the throughput curve. On the other hand, the cell center user 12 may benefit more from sharing the available SNR through the use of spatial multiplexing. Thus, rank one transmission (one rank equals one transmission layer) increases the coverage (in terms of cell edge data rates) whereas spatial multiplexing with two or more transmission layers improves peak data rates.

There is thus a trade-off between coverage and throughput for single-rank and multi-rank transmission. Further, beamforming is only possible if the number of streams is fewer than the number of transmit antennas 36 and there are correlated antennas sending the same information so as to enable beam formation. In this regard, a greater inter-antenna distance gives less correlated channels between the antennas for a given fixed angular spread and vice versa. Signals transmitted with horizontal and vertical polarization tend to experience uncorrelated fading and this can also be exploited to reduce spatial correlation if so desired. Another important characteristic of transmitting some signals with horizontal polarization and others with vertical polarization is that often the two orthogonal polarizations remain rather well separated even after reaching the receiver.

For beamforming to be possible there has to be at least two strongly correlated antennas 36 available at the node 22 for beamforming to any given user(s) 12. This requirement means that the distance between the two antennas 36 has to be small and the two antennas 36 need to have the same polarization. Thus, closely spaced co-polarized antennas fulfill this requirement with two antennas. Cross-polarized antennas on the other hand require, for example, four antennas where the pairs of antennas are closely spaced to enable beamforming.

LIE defines both Single-User (SU) MIMO and Multi-User (MU) MIMO modes. For SU-MIMO spatial multiplexing, low spatial correlations on both transmit and receive side and/or good isolation between different transmit-receive antenna pairs can be provided by either: co-polarized antennas on both transmit and receive side with large inter-antenna distances on both sides; or orthogonally polarized antennas on transmit side and receive side. Of course, the meaning of "large" and "small" in the context of antenna spacing should be interpreted relative to the angular spread and the wavelength on the sending side. For a base station mounted above rooftops the angular spread might for example be quite small, which means that a "small" antenna spacing may be in the order of half a wavelength, and a "large" antenna spacing might be 4-10 wavelengths. On the receiver side at the user 12, which typically experiences a much larger angular spread, half a wavelength might be considered "large."

Figure 3:
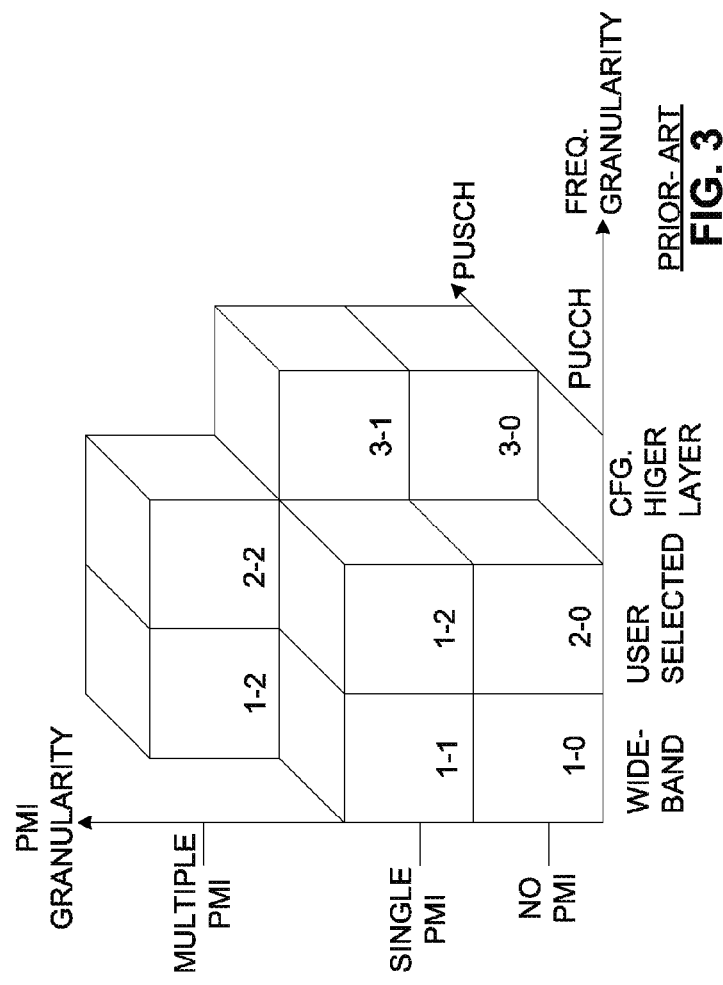
FIG. 3 is a diagram of per-user channel quality reporting modes known in the LTE standards, illustrating wideband reporting modes where a single CQI or PMI value is reported, and frequency-selective CQI and PMI reporting modes.

With the above transmission operations in mind, it may be noted that the current LTE CSI reporting modes only allow periodic frequency selective PMI or CQI to be reported in a bit efficient way. FIG. 3 illustrates known reporting modes for LTE, and one sees that a wideband CQI value may be reported without any PMI reporting, or with a single wideband PMI, or with two or more frequency-selective PMIs. Likewise, multiple CQIs (i.e., frequency-selective CQIs) can be reported with no PMI or with a single, wideband PMI.

Put simply, to keep a low overhead reporting either frequency-selective CQI or a frequency-selective PMI is preferable. Therefore, the bit-efficient signaling protocols currently adopted allow for one or the other (and also provide for simple wideband reporting, where neither a frequency-selective CQI nor a frequency-selective PMI is reported.)

As a general proposition, the prospect for significant beamforming gains increases with frequency-selective PMI reporting, although some such gains can be realized through the use of a single wideband PMI value. However, frequency-selective scheduling gains cannot be made unless the scheduler has access to frequency-selective CQI values. As noted, beamforming can improve the individual users' channel qualities;

whereas frequency selective scheduling exploits the fact that the active users 12 being supported by the node 22 in any given cell 20 may have varying channel quality over the frequency band.

Advantageously, then, the teachings herein provide, among other things, a method for determining the individual CSI modes in be used for each active user 12, to obtain the best combination of beamforming gains and scheduling gains at the node 22. The method takes into account a number of parameters. In one embodiment, the method considers coherence bandwidth, the number of transmit antennas 36, transmission rank, transmission bandwidth, channel conditions, loading, etc. Of course, other embodiments consider a selective subset of these parameters and significant improvements in overall user scheduling efficiency, expressed in terms of overall throughput over time, may be achieved by considering an advantageous handful of such parameters for determining the preferred channel quality reporting mode for each individual user 12 among a plurality of active users 12 operating within a given cell 20.

In one aspect, the teachings herein may be understood as providing a basis for evaluating the usefulness of receiving frequency-selective PMIs. Such information may be used as a complement to load information in an evaluation that determines whether, for the given user 12, it would be more useful to receive channel quality reports with frequency-selective CQIs or with frequency-selective PMIs. Alternatively, such information can be used alone, to determine whether frequency-selective PMI reporting from a given user 12 would be useful. "Useful" in this sense indicates whether the information would enable, or at least help in enabling, more efficient precoding selection of the user 12. In this regard, it may be understood that certain loading conditions and/or certain channel conditions make frequency-selective CQIs and/or frequency-selective PMIs completely or largely irrelevant to the ongoing scheduling and preceding decisions being made by the scheduler 32.

Figure 4:
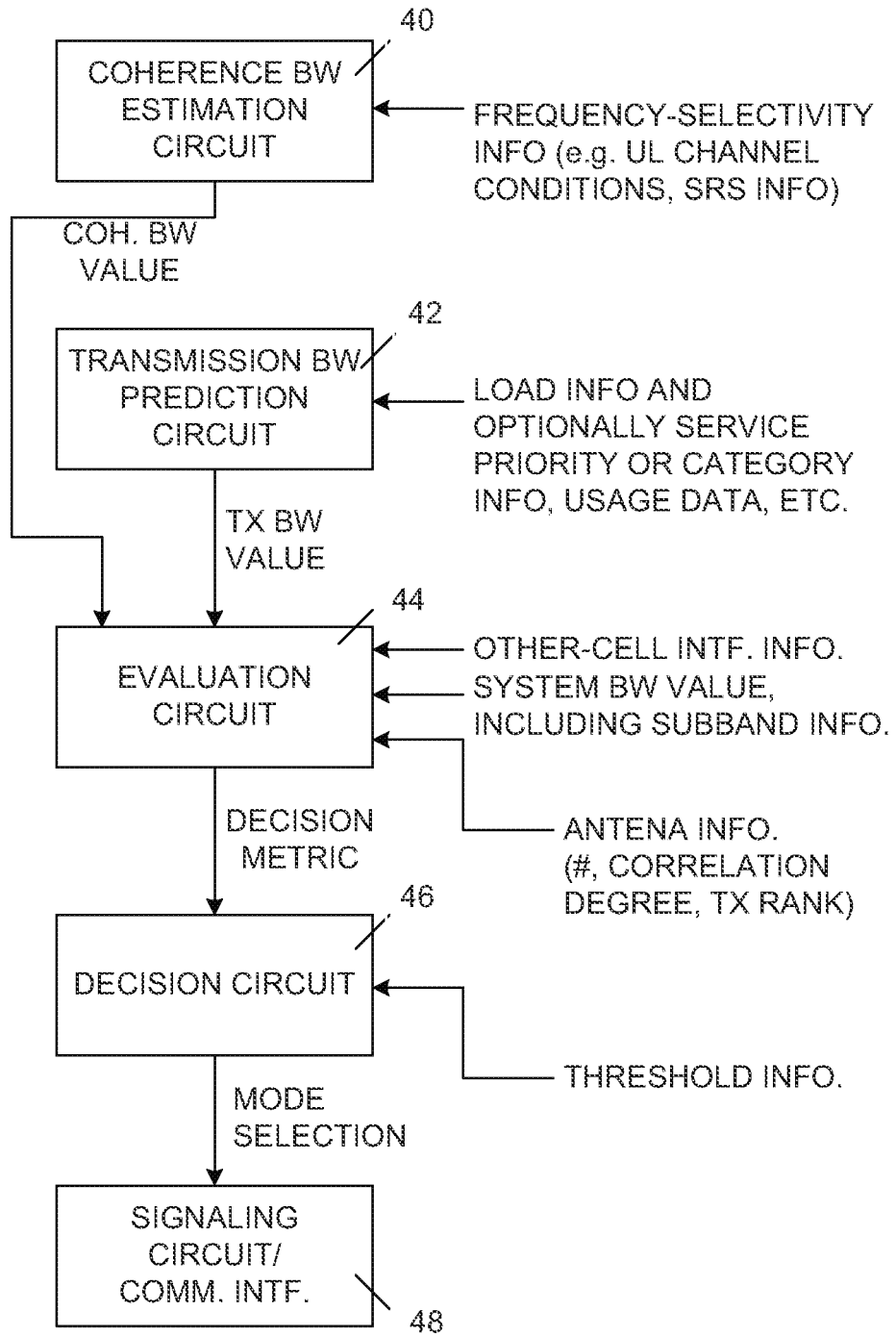
FIG. 4 is a block diagram of example processing units, such as may be implemented in the network node shown in FIG. 1 and which are depicted as functional circuits configured for carrying out one embodiment of the processing used to determine which reporting mode should be used by an individual user among a plurality of active users.

FIG. 4 introduces example details for the node 22, with a particular emphasis on one embodiment of the processing units, which may be functional circuits realized within programmable processing circuitry, used for determining which reporting modes should be used by individual users 12 among a plurality of active users 12 being supported on the same resources, such as a frequency band, by the node 22. For continuity of reference numbers, the circuitry depicted in FIG. 4 may be understood as comprising all or some of the constituent parts of the reporting mode controller 34 introduced in FIG. 1. Also, as one example, the shared resource may be the downlink time-frequency elements of an OFDM carrier, where the carrier may be allocated in terms of time and frequency for serving different ones of the users 12.

The node 22 is configured to dynamically choose a reporting mode to be used by an individual user 12-1 among a plurality of active users 12 competing for resources within a defined system bandwidth—e.g., the aggregate or overall carrier bandwidth—used for serving the plurality of active users 12. With that in mind, one sees a coherence bandwidth estimation circuit 40 configured to estimate coherence bandwidth 66 of a transmission channel 39 to or from the user 12-1 (see FIG. 2 for an identification of the channel 39 between the node 22 and a particular one of the users 12; denoted as user 12-1). Here, the coherence bandwidth 66 represents a frequency selectivity of the transmission channel 39. As a non-limiting example, the coherence bandwidth is a number expressing the size of the frequency range, e.g., in MHz, over which the channel 39 exhibits a flat or substantially flat frequency response.

The illustrated circuitry further includes a transmission bandwidth prediction circuit 42 configured to predict a transmission bandwidth 62 for the user 12-1, based at least in part on a total number of said active users 12. As a useful but non-limiting example, the transmission bandwidth prediction circuit 42 may predict the transmission bandwidth as a frequency value, e.g., in MHz or KHz, that represents the amount of bandwidth that is expected to be used for transmitting to the user during a next or upcoming scheduling interval. According to this non-limiting example, the prediction is made by dividing the overall system bandwidth by the number of active users 12. In other words, the prediction may be a rough prediction that indicates how little or how much of the system bandwidth the user 12-1 is expected to be allocated, based on the number of users 12 vying for the system bandwidth.

Figure 5:
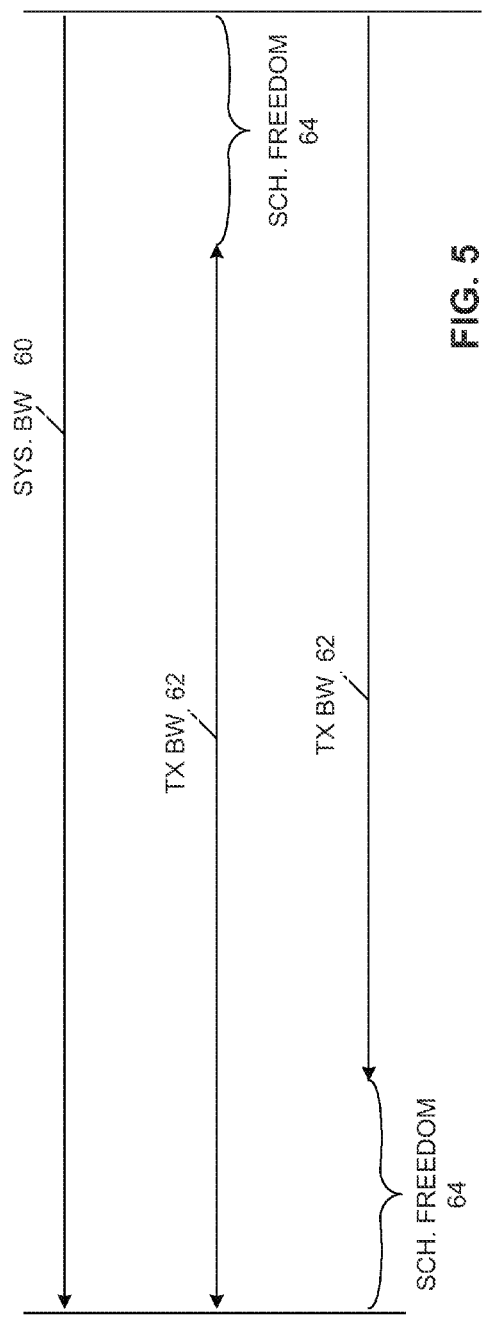
FIG. 5 is a diagram graphically illustrating an example definition of scheduling freedom as a function of the overall system bandwidth versus the predicted transmission bandwidth of an individual user.

Further, the illustrated circuitry includes an evaluation circuit 44 configured to evaluate the (predicted) transmission bandwidth with respect to the coherence bandwidth and the system bandwidth. These terms may be better understood with momentary reference to FIG. 5, which illustrates an example system bandwidth 60 and an example transmission bandwidth 62, as predicted for the given user 12-1. One sees that to the extent that the transmission bandwidth 62 is smaller than the overall system bandwidth 60 there exists some degree of scheduling freedom 64 available to the scheduler 32 in the node 22, with regard to selecting which frequencies are used for serving the user 12-1.

One may better envision this scheduling freedom 64 by imagining that the scheduler 32 measures the extent to which the transmission bandwidth 62 may be selectively positioned within the system bandwidth 60 by "sliding" it back and forth within the system bandwidth 60. In reality, if the scheduler 32 allows non-contiguous frequency assignments for the user 12-1 within the same scheduling interval, there may be an even greater degree of scheduling freedom 64. It also may be noted that rather than expressing the system bandwidth 60 as a numeric value representing the system bandwidth in MHz or some other frequency measure, the node 22 may simply "normalize" its evaluations by representing the system bandwidth 60 as "1" or some other reference value, and then expressing the transmission bandwidth 62 as a value between 0 and 1, where a value of 1 for the transmission bandwidth 62 would indicate that it equals the system bandwidth 60. Broadly, in one or more embodiments, scheduling freedom 64 takes on a value that functionally depends on the number or amount of resources available for allocation (e.g., unused resources). In this regard, if few such resources are available, scheduling freedom 64 is lower than compared to the case when such resources are plentiful.

Figure 6:
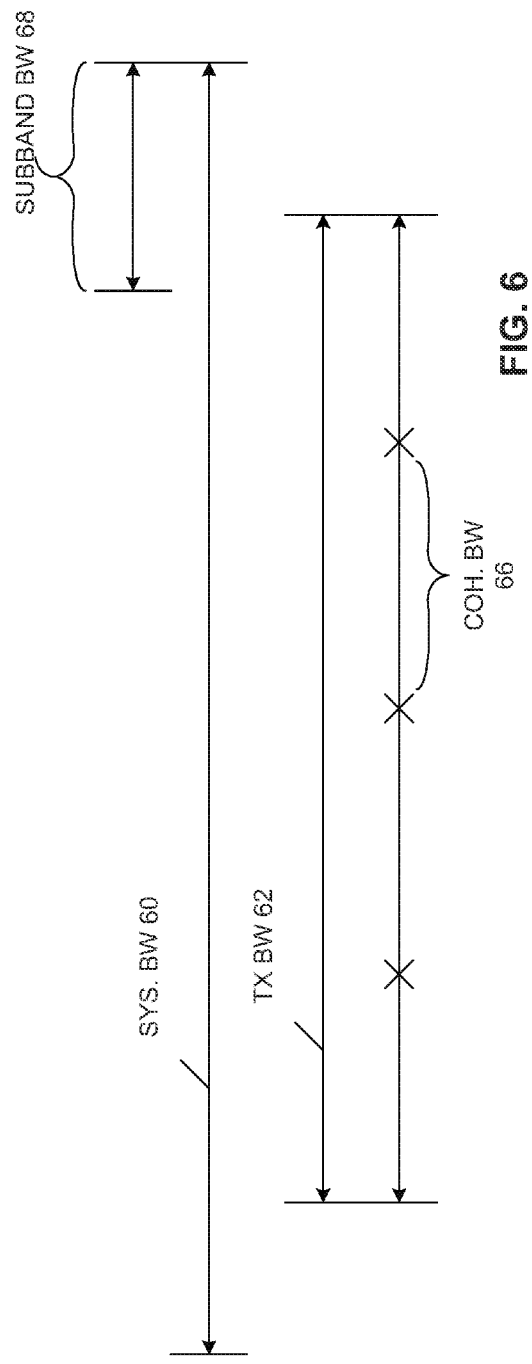
FIG. 6 is a diagram graphically illustrating an example definition of predicted transmission bandwidth evaluation with respect to the coherence bandwidth.

Using a similar graphical construct, FIG. 6 illustrates the coherence bandwidth 66 in relation to the transmission bandwidth 62, which in turn is depicted in relation to the system bandwidth 60. One sees that the node 22 can assess the frequency selectivity of the propagation channel 39 within the transmission bandwidth 62 by comparing its value to that of the coherence bandwidth 66. Put another way, if the coherence bandwidth of the channel 39 equals the transmission bandwidth 62, then the channel 39 may be considered to be flat (non-selective in terms of frequency) over the transmission bandwidth 62.

FIG. 6 is interesting for its additional illustration of a subband bandwidth (BW) 68 in relation to the system bandwidth 60. As one example, an OFDM downlink carrier may have an overall bandwidth of 20 MHz. For frequency-selective CQI or frequency-selective PMI reporting purposes, this overall bandwidth is divided into four 5 MHz subbands. As such, a given channel quality report from a given user 12 may have multiple CQI or PMI values, one for each of the defined subbands. As will be explained later, the node 22 may incorporate knowledge of the subband bandwidth 68 into its channel reporting mode determinations, and it will be remembered that all of these bandwidth numbers may be expressed as normalized values with respect to the system bandwidth 60.

Turning back to FIG. 4, one sees that the example reporting mode controller circuitry further includes a decision circuit 46 configured to determine whether to configure the user 12-1 to use frequency-selective channel quality reporting or frequency-selective precoder reporting, or neither, in dependence on the evaluation carried out by the evaluation circuit 44. Reiterating from above, the evaluation circuit 44 is configured to evaluate the transmission bandwidth 62 with respect to the coherence bandwidth 66 and the system bandwidth 60. The circuitry may also include a signaling circuit/communication interface 48, for sending control signaling to the users 12, indicating the decided reporting modes to be used by respective ones of those users 12.

In at least one embodiment, the network 10 of FIG. 1 is an LTE network and the node 22 as depicted in multiple diagrams herein comprises an eNodeB configured for operation in the LTE network. Further, the system bandwidth 60 comprises a defined carrier bandwidth for an OFDM downlink carrier signal transmitted by the eNodeB.

In at least one embodiment, the evaluation circuit 44 is configured to output a decision metric whose numeric value indicates whether frequency-selective channel quality reporting or frequency-selective precoder reporting is preferable. The metric of one or more other factors considered by the decision circuit 46 also may indicate that neither is preferred. Correspondingly, the decision circuit 46 is configured to compare the decision metric to a defined decision threshold having a value below which frequency-selective channel quality reporting is preferred and above which frequency-selective precoder reporting is preferred.

Figure 7:
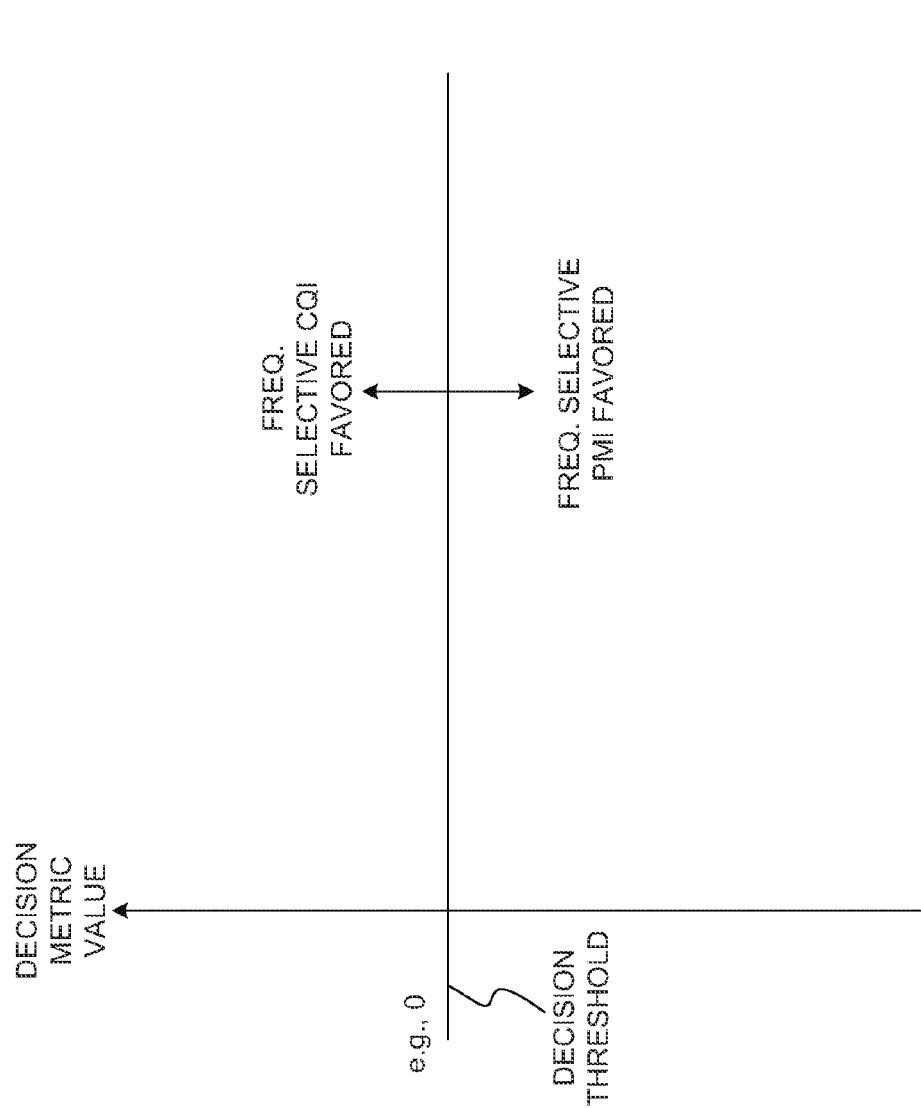
FIG. 7 is a diagram illustrating an example range of decision metric values and an example comparison threshold, for use in deciding between frequency-selective channel quality reporting and frequency-selective precoder reporting.

One sees an example of such processing in FIG. 7, which depicts a defined decision threshold against which the decision metric value may be compared. As a non-limiting example, the illustration presupposes that the metric is computed in such a way that higher metric values move the reporting mode (preference to frequency-selective PMI reporting, while lower values move the reporting mode preference toward frequency-selective CQI reporting. The opposite logic might also apply, in dependence on the particulars of how the metric is computed.

In at least one embodiment, the evaluation circuit 44 is configured to calculate the decision metric as the sum of a first term that is the scheduling freedom value, or that otherwise depends on the scheduling freedom value, and a second term that is, or that otherwise depends on the frequency variability value. For example, in one embodiment, the first term is the inverse of the scheduling freedom value, while the second term is the frequency variability value. The sum thus varies directly with the frequency variability value and inversely with the scheduling freedom value.

According to this formulation, higher sums indicate that frequency-selective precoder reporting is more useful, white lower value sums indicate that frequency-selective channel quality reporting is more useful. Higher and lower here may be understood in some relative sense, such as being above or below, respectively, some numerically defined threshold value against which the sum is compared.

To understand this aspect of the decision making process, consider that as the scheduling freedom 64 increases, it is less important that the node 22 have frequency-selective PMI information from the given user 12 for any particular subband 68 within the system bandwidth 60 because there is significant flexibility in frequency resource assignments for that user 12. Thus, the decision metric (i.e., the sum value) tends to get smaller as the scheduling freedom value increases. Conversely, as the frequency variability value grows larger, meaning that the transmission channel 39 to the user 12 is increasingly frequency-selective, having frequency-selective precoder reports becomes more useful, so that the node 22 can make a frequency-specific precoder determination for serving the user 12 in specific frequency subbands 68 within the system bandwidth 60. Thus, within the context of the foregoing formulation for determining the sum that serves as the decision metric, it is useful to make the sum increase with increasing frequency variability of the channel 39.

One approach to computing the first term is to compute the scheduling freedom value based on the ratio of the transmission bandwidth 62 to the system bandwidth 60, to thereby reflect the degree to which the transmission bandwidth 62 can be positioned within the system bandwidth 60. It will be understood that this value represents in some sense the scheduling freedom 64 graphically depicted in FIG. 5. The node 22 may then take the inverse of the scheduling freedom value to obtain the first term of the sum. Or, more simply, the node 22 may simply take the first term of the sum as system bandwidth 60 divided by the transmission bandwidth 62, irrespective of whether those bandwidths are expressed in terms of actual frequency bandwidths or are expressed in normalized values.

Further, the evaluation circuit 44 is configured in one or more embodiments to calculate the frequency variability value based on the ratio of the transmission bandwidth 62 to the coherence bandwidth 66, to thereby reflect the degree to which the transmission channel 39 is frequency-selective within the transmission bandwidth 62. The coherence bandwidth 66 may be estimated by the node 22 based on evaluating uplink signals from the user 12-1. Alternatively, the coherence bandwidth 66 may be computed by the user 12-1 and fed back to the node 22, based on the user's measurement of downlink signals across or within the system bandwidth 60. As a further alternative, the node 22 may compute the coherence bandwidth 66 based on receiving sounding reference signal measurements from the user 12-1, receiving pilot measurements from the user 12-1 for the downlink, or otherwise receiving relevant downlink signal measurement values from the user 12-1 that permit the node 22 to make an estimate of the coherence bandwidth 66.

As an example of the above processing:
Let sysBW equal the system bandwidth 60, trBW equal the transmission bandwidth 62 predicted for any given user 12, and cohBW equal the coherence bandwidth 66 determined for that user. With these representations, the decision metric is term1 minus term2, where $$\text{term1}=(sysBW-trBW)/sysBW \text{ and } \text{term2}=\max((trBW-cohBW)/trBW, 0).$$

With the above formulations, the terms provide normalized values that go from 0 to 1. Broadly, when the decision metric defined as term1−term2 is negative, frequency selective PMI reporting and when term1−term2 is positive, frequency selective CQI reporting should be used. When term1 and term2 both are at or close to zero, this can be taken as an indication that neither frequency-selective channel quality reporting or frequency-selective PMI reporting is needed, In at least one further variation of the above embodiment, the evaluation circuit 44 is configured to calculate the decision metric further based on at least one of: scaling the scheduling freedom value (term1) by a first coefficient and scaling the frequency variability value (term2) by a second coefficient, to compensate the decision metric for one or more additional considerations bearing on whether frequency-selective channel quality reporting is more or less preferred for the user than frequency-selective precoder reporting.

In an example of such an embodiment, the network 10 comprises a cellular network where the active users 12 are operating in one cell 20 are subject to other-cell interference, and the evaluation circuit 44 is configured to perform at least one of: calculating the first coefficient as a function of the variance of other-cell interference over the system bandwidth 60, so that the scheduling freedom value (term1) is scaled upward in the presence of higher variance for the other-cell interference across the system bandwidth 60. Further, the node 22 may calculate the second coefficient as a function of the number of transmit antennas 36 available for transmitting to the user 12-1 and an associated antenna correlation value expressing the degree to which those transmit antennas 36 are correlated, along with a transmission rank value determined for the user 12-1.

In understanding the above scaling method, one may appreciate that a higher-variance in other-cell interference across the system bandwidth 60 generally implies a higher variance in SNR for the user 12-1 across or within the system bandwidth 60. Such conditions generally favor frequency-selective CQI reporting, because the node 22 can use the frequency-selective CQI values to more strategically assign downlink frequency resources to the user 12-1 in the next or an upcoming scheduling interval. On the other hand, more transmit antennas 36 having reasonably well correlated transmission channels to the user 12-1 provide an opportunity for potentially robust frequency independent beamforming to the user 12-1, which makes frequency-selective PMI reporting less favorable in relation to frequency selective CQI. The ability of the user's channel to support higher transmission rank—i.e., more spatial multiplexing layers—instead tends to favor frequency-selective PMI reporting, because frequency-selective PMI reporting allows the node 22 to tailor its precoder selections/calculations for the particular frequencies allocated for serving the user 12-1.

As an example of the above scaling, the decision metric computation becomes

Decision_metric=$x$·term1−$y$·term2.

Of course, the node 22 may or may not use the scaling coefficients x and y, it may apply them differently in dependence on the particular formulation used for the decision metric. Those skilled in the art will appreciate the availability of various mathematical formulations to effect the decision-making process contemplated herein.

As one optional simplification of the decision making process, the decision circuit 46 in at least one embodiment is configured to choose a frequency-selective channel quality reporting mode if the coherence bandwidth 66 at least approximately equals said system bandwidth 60. This logic captures the recognition herein that a channel that is flat across the entirety of the system bandwidth 60 offers the opportunity to serve the user 12-1 on any of the available frequencies within the system bandwidth 60.

In the same or another embodiment, the transmission bandwidth prediction circuit 42 is configured to assume equal allocations of the system bandwidth among the active users 12, so that the transmission bandwidth 62 predicted for any given one of the users 12 equals the system bandwidth 60 divided by the total number of active users. In a variation of this approach, the transmission bandwidth prediction circuit 42 is configured to logically group the active users 12 according to service types or priorities and estimate corresponding allocations of the system bandwidth among those groups, and to predict the transmission bandwidth 62 of a particular user 12-1 based on the bandwidth allocation for that user's corresponding group and the number of active users 12 in the corresponding group.

As such, this variation allows for unequal allocation of the system bandwidth 60 between the groups. For example, the prediction circuit 42 may assume that users 12 within a higher-priority group or a group whose service type or types requires a higher QoS will share a larger allocation of system bandwidth 60 than will be shared by group having lower priority or lower QoS requirements.

In yet another embodiment, the same or similar refinements may be applied to individual users 12. That is, the transmission bandwidth prediction circuit 42 may predict the same value for all users 12, based on the simplifying assumption that all users 12 will share equal allocations of the system bandwidth 60, or it may make particularized predictions for individual ones of the users 12, or for given groups of the users 12. When making particularized predictions, the transmission bandwidth prediction circuit 42 might consider a number of parameters, such as subscriber status (e.g., gold, silver, bronze), ongoing or historic serving "fairness" considerations having to do with average throughput to the user 12, possibly an estimation of the amount that needs to be sent, etc.

In any case, in a least one embodiment, the decision circuit 42 is configured to weight the decision between frequency-selective channel quality reporting and frequency-selective precoder reporting to increasingly favor frequency-selective precoder reporting as the transmission bandwidth 62 predicted for a given user 12 increases. In the same or another embodiment, the decision circuit is configured to weight the decision between frequency-selective channel quality reporting and frequency-selective precoder reporting to increasingly favor frequency-selective precoder reporting as the coherence bandwidth 66 determined for the user 12 decreases.

Regardless, the decision circuit 42 is configured to select an available reporting mode for the user 12, where the selected mode is a frequency-selective CQI reporting mode or a frequency-selective PMI reporting mode, or neither (in which case the selected mode is a wideband CQI and/or PMI mode that does not include frequency-selective reporting of either PMI or CQI). Correspondingly, the node 22 includes a communication interface configured for sending signaling to the user 12 to configure the user 12 to use the selected reporting mode. As an example, see the radio communication interface 28 shown in FIG. 1 for the node 22. This interface will be understood in an example case to be radio transceiver circuits configured to communicate with the user 12 according to the signaling formats and protocols applicable in the air interface linking the node 22 to the users 12.

Figure 8:
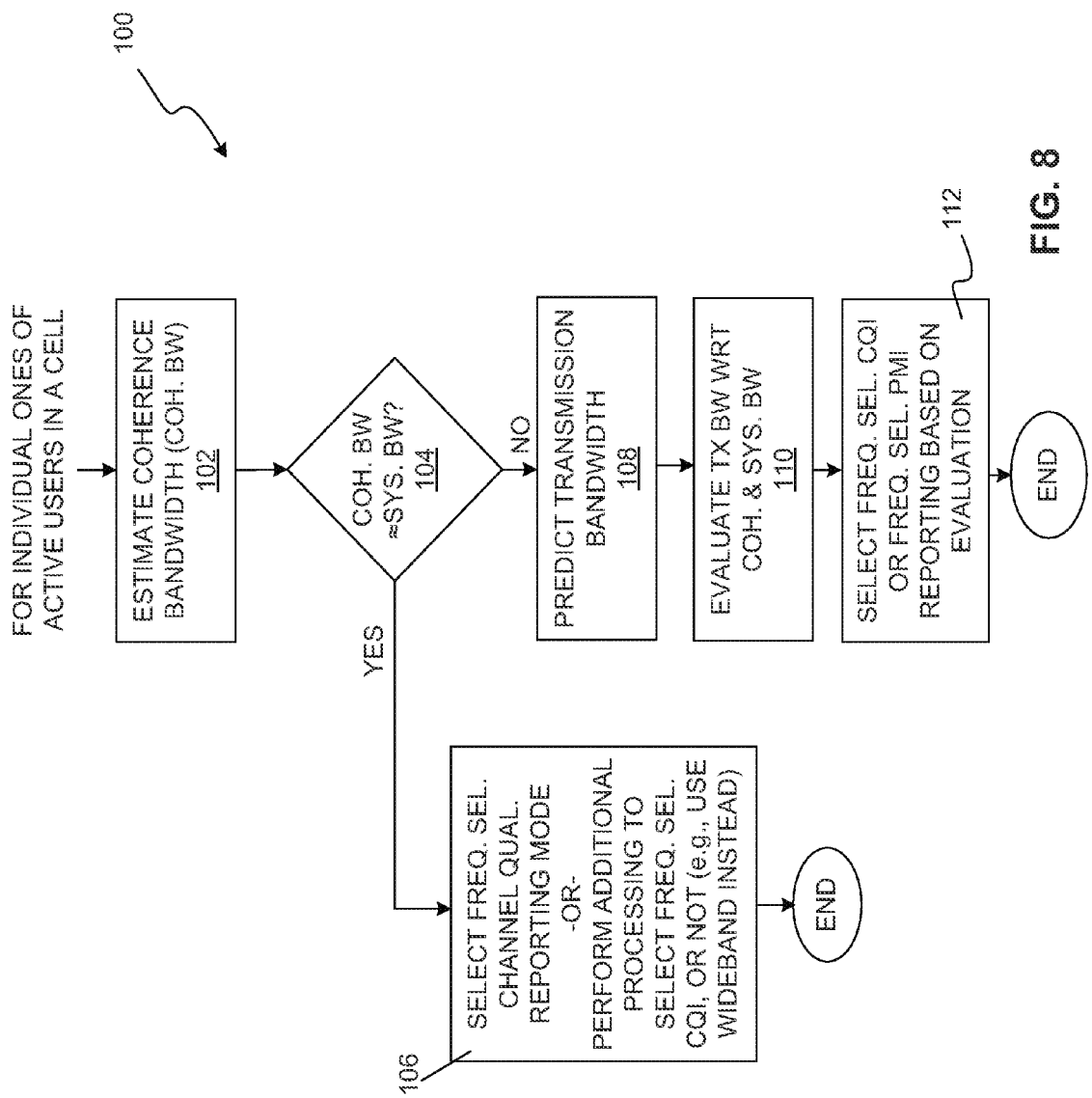
FIG. 8 is a logic flow diagram of one embodiment of a method of processing implemented at a network node, such as the network node shown in FIG. 1, for determining the channel reporting modes to be used by individual users among a plurality of active users.

FIG. 8 illustrates one embodiment of a method 100 corresponding to one or more of the above processing embodiments. In that regard, it will be understood that the processing depicted in FIG. 8 is carried out by the node 22, according to the execution of computer program instructions and/or according to the operation of one or more dedicated hardware circuits. It should also be understood that method 100 is depicted as a sequence of steps but the method itself is not necessarily limited to the depicted sequence unless so stipulated. Moreover, the method 100 may be executed in parallel for multiple users 12, or repeated for more than one user 12. Also note that certain computations and/or values made in the method 100 may be shared across the multiple users 12. For example, the same transmission bandwidth 62 may be predicted commonly for all active users 12 of the node 22.

With the above qualifications in mind, the method 100 chooses a reporting mode to be used by an individual user 12-1 among a plurality of active users 12 competing for resources within a defined system bandwidth 60 used for serving said plurality of active users 12. The method 100 includes estimating (Block 102) a coherence bandwidth 66 of a transmission channel 39 to or from the user 12-1. As before, the coherence bandwidth 66 represents a frequency selectivity of the transmission channel 39. In at least one embodiment, the transmission channel 39 is a downlink channel to the user 12-1 and resources in competition are the time-frequency resources of an OFDM downlink carrier used by node 22 for serving the user 12-1 and the other active users 12.

In one embodiment of the method 100, the coherence bandwidth 66 is compared to the system bandwidth 60, to see whether they are equal or at least roughly equal (Block 104). Note that according to one example definition, the coherence bandwidth 66 is at its maximum equal to the system bandwidth 60. If the coherence bandwidth 66 is at least roughly equal to the system bandwidth 60, the method 100 determines that frequency-selective precoder reporting should not be used—YES from Block 104. The processing algorithm can take the decision that the user 12-1 should use a frequency-selective channel quality reporting mode (Block 106. Processing then "ends," at least with making such a mode determination for this particular user, during this particular determination interval. In an alternative embodiment, the processing at Block 104 can be used to exclude the frequency-selective precoder reporting choice, and the processing at Block 106 is modified to choose between (1) using frequency-selective channel quality reporting or (2) using wideband channel quality reporting and wideband precoder reporting.

If the coherence bandwidth 66 is however not at least roughly equal to the system bandwidth 60—necessarily meaning that the coherence bandwidth less than the system bandwidth by more than some defined margin, e.g., say ten percent—processing goes from Block 104 to Block 108 (NO from Block 104), where the method 100 includes predicting the transmission bandwidth of the user 12-1, based at least in part on the total number of active users 12-1. In a simple example, the prediction divides the system bandwidth 60 by the number of users 12 competing for service within that bandwidth.

The decision to select a frequency-selective precoder reporting mode for the user 12-1 may consider multiple factors. In at least one embodiment, the method 100 includes evaluating the transmission bandwidth 62 with respect to the coherence bandwidth 66 and the system bandwidth 60 (Block 110).

In one example of such an evaluation, the node 22 computes a scheduling freedom value based on the ratio of the transmission bandwidth 62 to the system bandwidth 60. The evaluation further includes the computation of a frequency variability value, which depends on the coherence bandwidth 66 of the transmission channel 39 and thus may be expressed as the ratio of the transmission bandwidth 62 to the coherence bandwidth 66.

Regardless, the method 100 further includes determining (Block 112) whether to configure the user 12-1 to use frequency-selective channel quality reporting or frequency-selective precoder reporting, or neither, in dependence on the evaluation carried out in Block 110. The "neither" choice may be driven by other factors bearing on the scheduled allocation of resources, or it may be that the evaluation is based on summing the scheduling freedom value (or, in at least one embodiment, the inverse of the scheduling freedom value) and the frequency variability value, and comparing the sum to a defined threshold and/or to defined ranges.

When such a sum is computed so that it varies directly with the frequency variability value and inversely with the scheduling freedom value, higher-value sums indicate that frequency-selective precoder reporting by the user 12-1 is more useful to the node 22 (preferred), white lower-value sums indicate that frequency-selective channel quality reporting is more useful to the node 22. Intermediate values right around the decision threshold may suggest a middle ground where neither is preferred and the node 22 may therefore select a wideband channel quality reporting mode for the user 12-1, where neither frequency-selective CQIs or frequency-selective PMIs are reported by the user 12-1.

As a further succinct example of the above method of determining the preferred channel quality reporting modes to be used by individual users 12 among a plurality of active users 12 being served by a network node 22, such as an eNodeB or other type of cellular communication network base station, assume that the system bandwidth 60 (sysBW) is known, as is the report granularity (subbandBW). Here, the report granularity subbandBW is the granularity at which the system bandwidth 60 is subdivided into subbands 68 for reporting purposes, as was previously explained.

In at least one embodiment, even if the coherence bandwidth 66 is narrower than the reporting granularity, the node 22 bases its reporting mode determination decision for any given user 12 based on the best resolution it can get. For example, the following processing approach may be implemented for determining the preferred reporting mode to be used by any given user 12 among a plurality of active users 12:

---

1. Estimate for each user 12 his or her predicated transmission bandwidth 62 (trBW) considering the number of users 12 having data in their transmit buffers, priority in the scheduling queue maintained by the scheduler 30, and amount of data in buffered for a user.
2. Estimate the coherence bandwidth 66 (cohBW) of the channel 39.
3. If sysBW>cohBW
   If trBW>cohBW AND trBW>subbandBW
      Scheduling_freedom_value = (sysBW−trBW)/sysBW
      Frequency_variation_value (variation within trBW) = max((trBW−cohBW)/trBW, 0)
      Decision_Metric (indicating importance of PMI scheduling) =
         x·(scheduling_freedom_value) + y · (frequency_variability_value)
End

---

The above formulation gives a normalized value for the decision metric that ranges from 0 to 1. Where 0 represents no need for freq sel CQI/PMI and 1 a large need. When term1−term2 is negative, frequency selective PMI reporting should be selected and otherwise frequency selective channel quality reporting. If both term1 and term2 are close to 0 that can be taken as an indication that wideband reporting is sufficient (neither frequency selective PMI or CQI is needed).

One sees in the above pseudo code that the first term is scaled by x, which may be understood as a first coefficient, and that the second term is scaled by y, which may be understood as a second coefficient. By using x and/or y in this manner, the node 22 compensates the decision metric for one or more additional considerations bearing on whether frequency-selective channel quality reporting is more or less preferred for the user than frequency-selective precoder reporting.

As previously noted, In at least one such embodiment, where the network 10 is a cellular network and where the active users 12 in one cell 20 experience inter-cell interference from the active users 12 in one or more neighboring cells 20, the node 22 calculates the first coefficient as a function of the variance of other-cell interference over said system bandwidth 60, so that the term based on the scheduling freedom value is scaled downward in the presence of higher variance for the other-cell interference across said system bandwidth 60. The node 22 further calculates the second coefficient y as a function of the number of transmit antennas 36 available for transmitting to a user 12 and an associated antenna correlation value expressing the degree to which those transmit antennas 36 are correlated, along with a transmission rank value determined for the user 12. It will be appreciated that the transmission rank determination is a function of channel quality, with higher quality channels generally supporting higher transmission ranks or spatial multiplexing layers.

In the above decision metric formulation where "x" and "y" provide scaling, a large x means high inter-cell interference variations, useful with frequency selective channel quality reporting. A low "y" is typical with many correlated antennas and low rank, for which frequency selective precoding is less useful.

The decision metric specifically, or the decision making process in general, may consider other factors. For example, frequency-selective CQI reporting may impose a higher signaling overhead than frequency-selective PMI reporting. From a signaling overhead perspective, then, frequency-selective PMI reporting is preferable to frequency-selective CQI reporting. This type of overhead-related bias may be incorporated into the decision making process by building in a slight baseline bias towards frequency-selective precoder (PMI) reporting. Of course, the bias would not be set so as to prevent the selection of frequency-selective CQI reporting in cases where its scheduling benefits outweigh whatever signaling overhead penalty it imposes.

Thus, in one embodiment, the method of determining the reporting mode to be used by a given user 12 includes calculating a decision metric that depends on the value of the transmission bandwidth relative to the system bandwidth and on the value of transmission bandwidth relative to the coherence bandwidth, and comparing that decision metric to a defined numeric threshold which represents a decision point for the user with respect to whether frequency-selective precoder reporting is more useful than frequency-selective channel quality reporting. More particularly, the method includes biasing the decision metric or biasing the defined numeric threshold toward the selection of frequency-selective precoder reporting, to account for a signaling overhead penalty that attends usage of frequency-selective channel quality reporting.

Such processing may be implemented in the node 22, such as where the node 22 is configured to bias its decision toward the selection of frequency-selective precoder reporting as opposed to frequency-selective channel quality reporting, based on there being a signaling overhead penalty associated with using frequency-selective channel quality reporting. The amount of biasing, which may be implemented as a permanent offset in the direction of choosing frequency-selective precoder reporting over frequency-selective channel quality reporting, may be set in direct dependence on the size of the signaling overhead penalty.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a wireless communication network node of choosing a reporting mode to be used by an individual user among a plurality of active users competing for resources within a defined system bandwidth used for serving said plurality of active users, said method comprising:
   estimating a coherence bandwidth of a transmission channel to or from the user, said coherence bandwidth representing a frequency selectivity of the transmission channel;
   predicting a transmission bandwidth for the user, based at least in part on a total number of said active users;
   evaluating said transmission bandwidth with respect to said coherence bandwidth and said system bandwidth, wherein said step of evaluating yields a decision metric whose numeric value indicates whether frequency-selective channel quality reporting or frequency-selective precoder reporting is preferable; and
   determining whether to configure the user to use frequency-selective channel quality reporting or frequency-selective precoder reporting, or neither, in dependence on said evaluation.

2. The method of claim 1, wherein said step of determining comprises comparing said decision metric to a defined decision threshold having a value above which frequency-selective channel quality reporting is preferred and below which frequency-selective precoder reporting is preferred.

3. The method of claim 1, wherein said step of evaluating comprises calculating the decision metric as a function of a scheduling freedom value and frequency variability value, including calculating said scheduling freedom value based on the ratio of the difference between said system bandwidth and said transmission bandwidth to said system bandwidth, to thereby reflect the degree to which the transmission bandwidth can be positioned within the system bandwidth, and further including calculating said frequency variability value as a maximum of zero or a ratio formed as the difference of said transmission bandwidth and said coherence bandwidth to said transmission bandwidth, to thereby reflect the degree to which the transmission channel is frequency-selective within said transmission bandwidth.

4. The method of claim 3, wherein calculating said decision metric further includes at least one of: scaling said scheduling freedom value by a first coefficient and scaling said frequency variability value by a second coefficient, to compensate said decision metric for one or more additional considerations bearing on whether frequency-selective channel quality reporting is more or less preferred for the user than frequency-selective precoder reporting.

5. The method of claim 4, wherein a wireless communication network that includes said wireless communication network node comprises a cellular network where said active users are operating in one cell and are subject to other-cell interference, and further comprising at least one of: calculating said first coefficient as a function of the variance of other-cell interference over said system bandwidth so that said scheduling freedom value is scaled upward in the presence of higher variance for said other-cell interference across said system bandwidth; and calculating said second coefficient as a function of the number of transmit antennas available for transmitting to the user and an associated antenna correlation value expressing the degree to which said transmit antennas are correlated, along with a transmission rank value determined for the user.

6. The method of claim 1, wherein said step of determining comprises choosing said frequency-selective channel quality reporting mode if said coherence bandwidth at least approximately equals said system bandwidth.

7. The method of claim 1, wherein said step of predicting comprises assuming equal allocations of system bandwidth among said active users so that the transmission bandwidth predicted for the user equals said system bandwidth divided by the total number of active users, or comprises grouping said active users according to service types or priorities and estimating corresponding allocations of said system bandwidth among said groups, and predicting the transmission bandwidth of the user based the bandwidth allocation for the corresponding group and the number of said active users in said corresponding group.

8. The method of claim 1, wherein said step of determining comprises weighting the decision between said frequency-selective channel quality reporting and said frequency-selective precoder reporting to increasingly favor said frequency-selective precoder reporting as the transmission bandwidth predicted for the user increases.

9. The method of claim 1, wherein said step of determining comprises weighting the decision between said frequency-selective channel quality reporting and said frequency-selective precoder reporting to increasingly favor said frequency-selective precoder reporting as the coherence bandwidth determined for the user decreases.

10. The method of claim 1, wherein said step of determining yields a selected reporting mode for the user and wherein the method further comprises sending signaling to the user to configure the user to use the selected reporting mode.

11. The method of claim 1, wherein said step of evaluating comprises calculating the decision metric that depends on the value of the transmission bandwidth relative to the system bandwidth and on the value of transmission bandwidth relative to the coherence bandwidth, and comparing that decision metric to a defined numeric threshold which represents a decision point for the user with respect to whether frequency-selective precoder reporting is more useful than frequency-selective channel quality reporting, and wherein the method further includes biasing the decision metric or biasing the defined numeric threshold toward the selection of frequency-selective precoder reporting, to account for a signaling overhead penalty that attends usage of frequency-selective channel quality reporting.

12. A wireless communication network node configured to dynamically choose a reporting mode to be used by an individual user among a plurality of active users competing for resources within a defined system bandwidth used for serving said plurality of active users, said wireless communication network node comprising:

a coherence bandwidth estimation circuit configured to estimate coherence bandwidth of a transmission channel to or from the user, said coherence bandwidth representing a frequency selectivity of the transmission channel;

a transmission bandwidth prediction circuit configured to predict a transmission bandwidth for the user, based at least in part on a total number of said active users;

an evaluation circuit configured to evaluate said transmission bandwidth with respect to said coherence bandwidth and said system bandwidth, wherein said evaluation circuit is further configured to output a decision metric whose numeric value indicates whether frequency-selective channel Quality reporting or frequency-selective precoder reporting is preferable; and a decision circuit configured to determine whether to configure the user to use frequency-selective channel quality reporting or frequency-selective precoder reporting, or neither, in dependence on the evaluation by said evaluation circuit.

13. The wireless communication network node of claim 12, wherein a wireless communication network that includes said wireless communication network node comprises a Long Term Evolution, LTE, network, and said wireless communication network node comprises an eNodeB configured for operation in said LTE network, and said system bandwidth comprises a defined carrier bandwidth for an Orthogonal Frequency Division Multiplexing, OFDM, downlink carrier signal transmitted by said eNodeB.

14. The wireless communication network node of claim 12, wherein said decision circuit is configured to compare said decision metric to a defined decision threshold above which frequency-selective channel quality reporting is preferred and below which frequency-selective precoder reporting is preferred.

15. The wireless communication network node of claim 12, wherein said evaluation circuit is configured to calculate the decision metric as a function of a scheduling freedom value and frequency variability value, including calculating said scheduling freedom value based on the ratio of the difference between said system bandwidth and said transmission bandwidth to said system bandwidth, to thereby reflect the degree to which the transmission bandwidth can be positioned within the system bandwidth, and further including calculating said frequency variability value as a maximum of zero or a ratio formed as the difference of said transmission bandwidth and said coherence bandwidth to said transmission bandwidth, to thereby reflect the degree to which the transmission channel is frequency-selective within said transmission bandwidth.

16. The wireless communication network node of claim 15, wherein said evaluation circuit is configured to calculate said decision metric further based on at least one of: scaling said scheduling freedom value by a first coefficient and scaling said frequency variability value by a second coefficient, to compensate said decision metric for one or more additional considerations bearing on whether frequency-selective channel quality reporting is more or less preferred for the user than frequency-selective precoder reporting.

17. The wireless communication network node of claim 16, wherein said wireless communication network comprises a cellular network where said active users are operating in one cell and are subject to other-cell interference, and wherein said evaluation circuit is configured to perform at least one of: calculating said first coefficient as a function of the variance of other-cell interference over said system bandwidth so that said scheduling freedom value is scaled upward in the presence of higher variance for said other-cell interference across said system bandwidth; and calculating said second coefficient as a function of the number of transmit antennas available for transmitting to the user and an associated antenna correlation value expressing the degree to which said transmit antennas are correlated, along with a transmission rank value determined for the user.

18. The wireless communication network node of claim 12, wherein said decision circuit is configured to choose said frequency-selective channel quality reporting mode if said coherence bandwidth at least approximately equals said system bandwidth.

19. The wireless communication network node of claim 12, wherein said transmission bandwidth prediction circuit is configured to assume equal allocations of said system bandwidth among said active users so that the transmission bandwidth predicted for the user equals said system bandwidth divided by the total number of active users, or to logically group said active users according to service types or priorities and estimate corresponding allocations of said system bandwidth among said groups, and predict the transmission bandwidth of the user based the bandwidth allocation for the corresponding group and the number of said active users in said corresponding group.

20. The wireless communication network node of claim 12, wherein said decision circuit is configured to weight the decision between said frequency-selective channel quality reporting and said frequency-selective precoder reporting to increasingly favor said frequency-selective precoder reporting as the transmission bandwidth predicted for the user increases.

21. The wireless communication network node of claim 12, wherein said decision circuit is configured to weight the decision between said frequency-selective channel quality reporting and said frequency-selective precoder reporting to increasingly favor said frequency-selective precoder reporting as the coherence bandwidth determined for the user decreases.

22. The wireless communication network node of claim 12, wherein said decision circuit is configured to select a reporting mode for the user and wherein said wireless communication network node further includes a communication interface configured for sending signaling to the user to configure the user to use the selected reporting mode.

23. The wireless communication network node of claim 12, wherein the node is configured to bias its decision toward the selection of frequency-selective precoder reporting as opposed to frequency-selective channel quality reporting, based on there being a signaling overhead penalty associated with using frequency-selective channel quality reporting.

24. The method of claim 1, wherein said evaluating is used to determine whether to configure the user to use wideband reporting or frequency selective reporting, and if frequency selective reporting is to be used, said evaluating is used to determine whether to configure the user to use frequency-selective channel quality reporting or frequency-selective precoder reporting.

25. The wireless communication network node of claim 12, wherein said decision circuit is configured to use said evaluation to determine whether to configure the user to use wideband reporting or frequency selective reporting, and if frequency selective reporting is to be used, said decision circuit is configured to use said evaluation to determine whether to configure the user to use frequency-selective channel quality reporting or frequency-selective precoder reporting.

\* \* \* \* \*